United States Patent [19]
Kelly et al.

[11] Patent Number: 4,866,850
[45] Date of Patent: * Sep. 19, 1989

[54] CLINOMETER WITH ROLLING LIQUID CONDUCTOR

[76] Inventors: Vincent M. Kelly; Madelyn I. Kelly, both of P.O. Box 449, Prescott, Ariz. 86302

[*] Notice: The portion of the term of this patent subsequent to May 31, 2005 has been disclaimed.

[21] Appl. No.: 169,891

[22] Filed: Mar. 18, 1988

Related U.S. Application Data

[63] Continuation-in-part of Ser. No. 6,485, Jan. 23, 1987, Pat. No. 4,747,216.

[51] Int. Cl.$^4$ .............................. G01C 9/06
[52] U.S. Cl. ................... 33/366; 33/1 PT; 33/346; 340/689
[58] Field of Search ............. 33/366, 1 PT, 346; 340/689

[56] References Cited

U.S. PATENT DOCUMENTS

| | | | |
|---|---|---|---|
| 2,511,525 | 6/1950 | Bradwell et al. | 33/366 |
| 2,742,707 | 4/1956 | Jacobsen et al. | 33/206 |
| 2,893,134 | 7/1959 | Shea et al. | 33/206 |
| 3,332,060 | 7/1967 | Liljequist | 340/71 |
| 3,584,387 | 6/1971 | Sturm | 33/206 |
| 4,167,818 | 9/1979 | Cantarella et al. | 33/366 |
| 4,493,155 | 1/1985 | Comeau et al. | 33/366 |
| 4,503,622 | 3/1985 | Swartz et al. | 33/366 |
| 4,587,741 | 5/1986 | Rorden et al. | 33/366 |
| 4,603,484 | 8/1986 | Strothman | 33/366 |
| 4,644,662 | 2/1987 | Anderson et al. | 33/366 |
| 4,672,753 | 6/1987 | Kent et al. | 33/366 |
| 4,747,216 | 5/1988 | Kelly et al. | 33/366 |

OTHER PUBLICATIONS

"Digital Level Meter", Heath-Zenith Instruction Manual, Apr. 1987.
"Anglestar Digital Protractor Applications", Sperry Corporation, Apr. 1986.
"Aviation Products Report-Do You Know All the Angles?", Aviation Equipment Maintenance, May 1987, pp. 50-51, 52-53.
"Anglestar Protractor System", Sperry Corporation, Feb. 1986.
"Accustar Electronic Clinometer", Sperry Corporation, Nov. 1985.

*Primary Examiner*—William A. Cuchlinski, Jr.
*Assistant Examiner*—Thomas B. Will
*Attorney, Agent, or Firm*—Cahill, Sutton & Thomas

[57] ABSTRACT

A clinometer includes a cylindrical cavity having a conductive cylindrical wall and a vertical annular wall having a high resistance resistor uniformly distributed thereon. A freely moving, heavy conductive ball, which may be solid or liquid such as mercury, seeks the lowest point in the cavity. The conductive ball contacts both the conductive cylindrical wall at a point along the resistor, thereby defining the resistance between a terminal connected to one end of the resistor and another terminal connected to the conductive cylindrical wall. This resistance is a function of the inclination of the clinometer. A reference voltage is applied to the end terminal of the resistor. The terminal connected to that conductive cylindrical wall may be coupled to a circuit that converts a voltage across the resistance into a digital voltage that represents the inclination of the clinometer. In another embodiment, the resistor is cylindrical, the vertical wall is conductive, and the conductive ball is liquid that contacts both the cylindrical resistor and the conductive wall. The circuit is connected to the conductive vertical wall and an end terminal of the cylindrical resistor produces a voltage across the resistance between the conductive liquid ball and the end terminal. The voltage represents the inclination.

11 Claims, 5 Drawing Sheets

CLINOMETER WITH ROLLING LIQUID CONDUCTOR

CROSS-REFERENCE TO RELATED APPLICATION

This application is a continuation-in-part of our pending application Ser. No. 006,485, "CLINOMETER/ACCELEROMETER AND METHOD", filed Jan. 23, 1987.

BACKGROUND OF THE INVENTION

The invention relates to clinometers (also known as inclinometers) and accelerometers, and more particularly to such devices that utilize a conductive, freely movable material to contact both a conductor and a resistor to define the resistance of the resistor as a function of the inclination of the apparatus or the acceleration thereof, and more particularly to such that devices capable of producing an essentially continuous variable output signal representing up to 360 degrees of rotation.

Quite a variety of electronic clinometers and accelerometers have been proposed. For example, U.S. Pat. No. 2,893,134 discloses a clinometer in which a conductive ball is supported by an arcuate conductor and an arcuate linear resistor. The arcuate conductor thereby carries a voltage representing the amount of voltage division across the arcuate resistor at the point at which the conductive wall contacts it. This signal is fed into an amplifier, the output which is utilized to control self-leveling of a scraper blade. The device subtends an arc of roughly 80 degrees. U.S. Pat. No. 4,493,155 discloses a device for providing a remote indication of the angular position of rotatable equipment, wherein a hollow cage member is affixed to the rotatable equipment. The inner surface of the cage is supplied with a series of electrically conductive surfaces, the positions of which are known in relation to the orientation of the cage. A conductive rolling member contained within the cage is free to move under the influence of gravity and contacts the lowermost pairs of conductive surfaces. Sensing devices detect the pair of surfaces currently in electrical communication by virtue of the position of the conductive rolling member, providing a stepped indication of rotational orientation. U.S. Pat. No. 4,503,622 discloses a clinometer that utilizes a bubble level of the electrolytic type partially filled with a suitable conductive liquid and provided with electrical contacts within the bubble container. A differential signal is produced across the electrical contacts when the level is tilted. U.S. Pat. No. 4,167,818 discloses a device in which a ball movable around a 360 degree toroidal race capacitively couples signals between signal source and signal collector electrode assemblies provide on opposite sides of the toroidal race. U.S. Pat. No. 3,584,387 discloses a slope indicating device in the form of a carpenter's level wherein a conductive sphere disposed in an annular chamber produces contact between predetermined electrical conductors when the level is disposed precisely at preselected angles.

None of the prior clinometers/accelerometers is an inexpensive device that provides essentially continuous electrical output signals up to 360 degrees of rotation of the device and is capable of operating at very low levels of electrical power consumption to provide a precise digital readout that indicates both positive and negative angles of inclination or the direction of acceleration. Some of the prior devices that utilize conductive balls in a race are likely to produce inaccurate results if the device is subjected to vibration, as the conductive ball will bounce, repetitively making and breaking electrical contact with contact point the location of which represents the angle of inclination or the amount of acceleration, or making contact with numerous "illegal" contact points.

SUMMARY OF THE INVENTION

Accordingly, it is an object of the invention to provide a transducer that can be utilized as a clinometer or accelerometer and is capable of providing accurate, continuous output representative of the transducer's rotational position up to 360 degrees of orientation.

It is another object of the invention to provide an inexpensive electronic clinometer capable of both positive and negative angles in continuous measurement up to 360 degrees of orientation of the clinometer.

It is another object of the invention to provide a inexpensive electronic clinometer or accelerometer that provides a digital readout and consumes a minimum amount of power.

It is another object of the invention to provide an inexpensive electronic clinometer or accelerometer that is insensitive to relatively high levels of vibration.

Briefly described, and in accordance with one embodiment thereof, the invention provides an apparatus that can be used as a clinometer or accelerometer, wherein an annular cylindrical cavity has a 360 degree conductive cylindrical surface and a substantially vertical annular surface bounding the cavity containing an annular high resistance resistor having a small gap between the extreme ends thereof. A conductive material, preferably in the form of a metal ball, seeks the lowest point in the annular cavity and electrically closes the circuit between the cylindrical conductor to a point of the annular resistor that indicates the inclination of the apparatus or to the acceleration thereof. In one described embodiment of the invention, the annular resistor is a deposited serpentine resistor essentially uniformly disposed on the vertical annular wall. A second identical annular resistor is formed on an opposite substantially vertical annular wall bounding the cavity. An off-center or pivotal feature of the cylindrical surface urges the conductive ball against one or the other of the vertical annular walls. In one embodiment of the invention, the substance is a conductive liquid, such as mercury. In another embodiment of the invention, the cavity is filled with a plurality of relatively light, electrically insulative balls, so that the heavier conductive ball seeks the lowest point in the cavity. The insulative balls act to dampen bouncing of the conductive ball due to vibration imparted to the housing of the clinometer. In another embodiment of the invention, an annular insulative member generally in the shape of a doughnut fills the cavity except for the portion occupied by the conductive ball, and dampens bouncing of the conductive ball due to vibration. In another embodiment of the invention, the portion of the cavity not occupied by the conductive sphere is filled by dielectric liquid. The dielectric material dampens the vibratory force applied to the conductive sphere and makes the clinometer less sensitive to vibration. In one described embodiment of the invention, the electrical current flowing through the resistor and the conductive sphere is applied to an analog input of an analog-to-digital converter circuit, which drives an LCD digital display that indicates the angle of inclination and the polarity thereof if the device is used as a clinometer, and indicates the amplitude and direction of the acceleration if the device is used as an accelerometer.

DETAILED DESCRIPTION OF THE INVENTION

Figures 1, 2, 3:
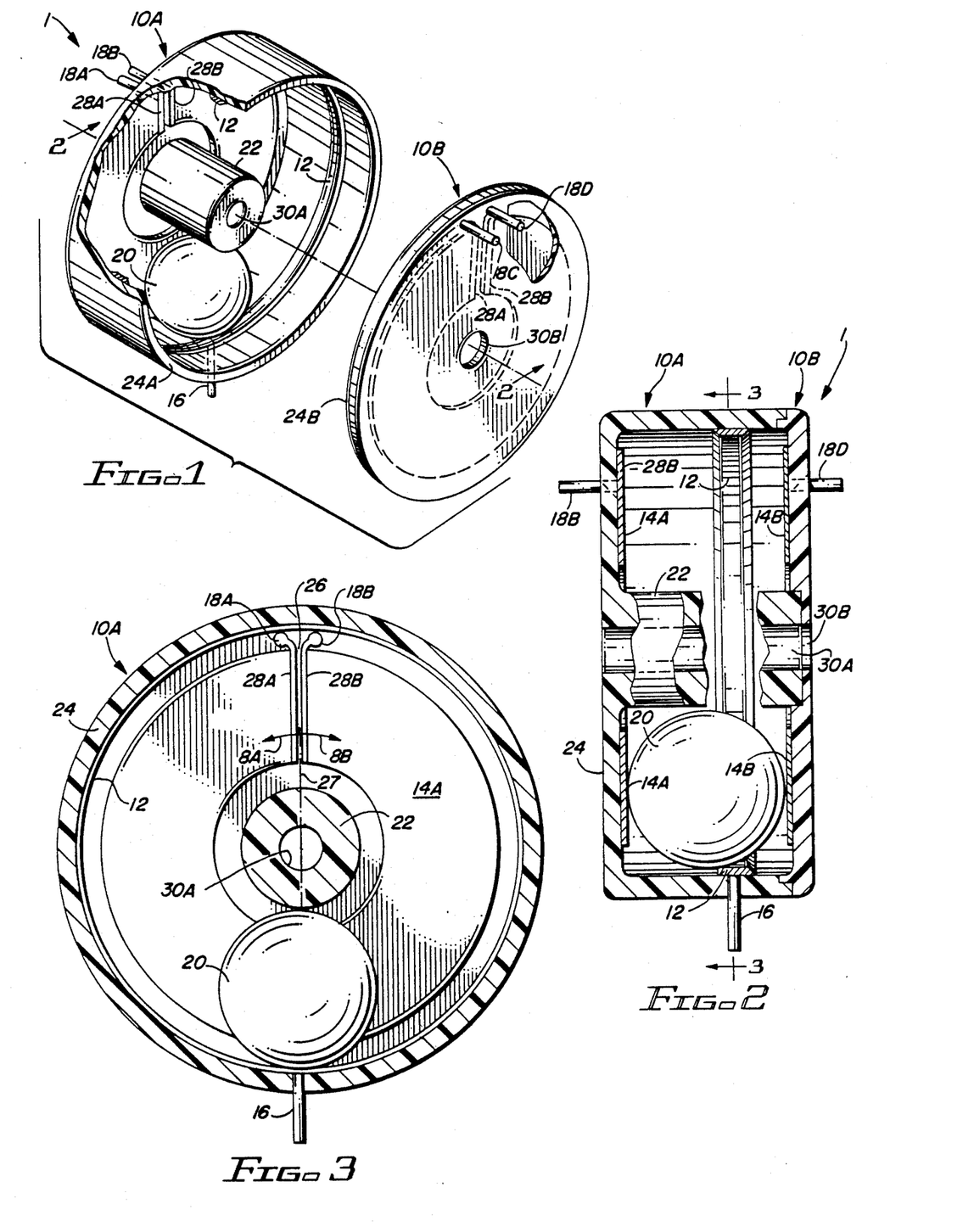
FIG. 1 is an exploded perspective view of the clinometer of the present invention.
FIG. 2 is a section view taken along section line 2—2 of FIG. 1.
FIG. 3 is a section view taken along section line 3—3 of FIG. 2.

Referring now to FIGS. 1-3, the device designated by reference numeral 1 will hereinafter be referred to as "clinometer 1", even though the device can be utilized to indicate angle of inclination or amount of acceleration (or deceleration).

Clinometer 1 includes a cylindrical housing section 10A having a circular, perpendicular rear wall supporting a cylindrical spacer 22 that is concentric with the cylindrical housing section 10A. A mounting hole 30A extends through spacer 22, aligned with the axis thereof. A circular right end cover 10B is attached to the open right end of the housing 10A parallel to the left circular end, thereby defining a toroidal cavity within clinometer 1. As indicated in FIG. 2, housing 10A and the circular right cover 10B are composed of dielectric material, as is cylindrical spacer 22. Preferably, cylindrical spacer 22 is integral with housing 10A. An opening 30B in circular cover 10B is concentric with opening 30A, thereby providing a mounting hole by means of which the clinometer 1 can be attached to a body such as a level or other apparatus, the angle of inclination of which is to be measured.

A ring conductor 12 having a circular cross-section is attached to the interior surface of housing 10A. A conductive terminal 16 extends through the insulative wall of housing 10A, making electrical contact to ring conductor 12, allowing external electrical connection thereto.

A nearly annular layer of highly resistive material 14A is disposed on the vertical inner surface of the circular rear wall of housing 10A. (This substrate and resistive layer deposited thereon can be obtained as Part No. 98-1153 from Duncan Electronics of Costa Mesa, Calif.). As best seen in FIG. 3, resistive layer 14A begins at the left side of a narrow gap 26, and extends around the insulative spacer 22 all the way to the opposite side of a narrow gap 26 in the upper portion of annular resistive layer 14A, which preferably is approximately 3 mils wide, or wide enough to prevent current from crossing the gap. A conductive terminal 18A is connected to the portion of annular resistor 14A along the entire width thereof adjacent to the left side of gap 26 by means of conductor 28A. A similar conductive terminal 18B is connected to the portion of annular resistor 14A along the entire width thereof adjacent to the right side of gap 26 by means of conductor 28B.

An entirely similar nearly annular resistor 14B is formed on the vertical inner face of circular cover 10B, as shown in FIG. 2. Conductive terminals 18C and 18D extend through the insulative wall of cover 10B, allowing external electrical contact to the opposite ends of annular resistor 14B.

Ring conductor 12 may be positioned in off-center relationship to heavy conductive ball 20 (described subsequently) to favor its electrical contact with one or the other of resistors 14A and 14B.

In accordance with the present invention, the heavy, smooth surfaced, precisely spherical conductive ball 20 is disposed in and moves freely within the annular "raceway" defined by conductor 12 and the two highly resistive nearly annular side walls 14A and 14B and the cylindrical spacer 22.

Conductive ball 20 naturally rolls to the lowest point of the annular cavity of clinometer 1, gently "wiping" and making electrical contact with one or the other of vertical annular resistors 14A or 14B. Note that axis 27 (FIG. 3) is precisely aligned with the center of the annular cavity and the center of gap 26.

As subsequently described, the external circuitry connected to terminals 18A-D can be adjusted to indicate a "zero" point or "level" point at any point along annular resistors 14A and 14B. The readout then indicates the amount clinometer 1 is inclined in the direction of arrow 8A or 8B from that present zero point.

For example, as clinometer 1 is tilted in the direction of arrow 8A in FIG. 3, conductive ball 20 provides an electrical connection between the ring conductor 12 and the ball-to-resistor contact point of resistor 14A, decreasing the resistance between terminals 16 and 18A in proportion to the angle of inclination, and increasing the resistance between terminals 16 and 18B in proportion to the angle of inclination.

If clinometer 1 becomes inclined in the direction of arrow 8B, the resistance between terminals 16 and 18A increases to higher values in proportion to the angle of inclination in the direction of arrow 8B, while the resistance between terminals 16 and 18B decreases.

The resulting voltage division produces a pickup voltage on terminal 16 which is sensed by a sensing circuit, suitably processed, and converted to a digital readout that indicates both the direction or polarity of the inclination of clinometer 1 and the magnitude of the angle of inclination of axis 27 (FIG. 3) from vertical.

Figure 4:
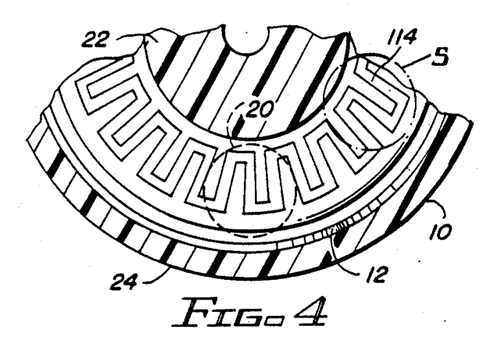
FIG. 4 is a partial section view illustrating an annular serpentine resistive pattern utilized on the vertical annular end walls of the clinometer of FIG. 1.
Figure 5:
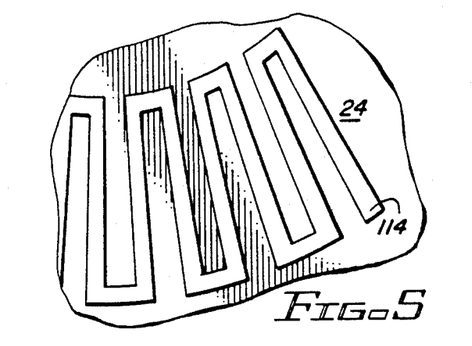
FIG. 5 is an enlarged view of detail 5 of FIG. 4.

As a practical matter, it may be desirable to provide a very high amount of resistance between the opposite ends of annular resistor 14A. In order to accomplish this without use of material having an extremely high resistivity or sheet resistance, a serpentine, annular resistive pattern 114 may be provided for annular resistors 14A and 14B as shown in FIGS. 4 and 5. Alternately, an annular wound resistive structure could be used to implement annular resistor 14A. The term "serpentine" as used herein is intended to encompass both planar serpentine resistive patterns and wound resistor structures. Quite a variety of techniques could be utilized for providing a thin layer of resistive material on the vertical walls of housing 14A and cover 14B to provide reliable electrical contact to conductive ball 20 as it "wipes" the resistive material while rolling to the lowest point in the annular cavity. For example, various resistive materials can be silkscreened or vapor deposited onto the insulative surfaces.

Figures 6, 7, 8:
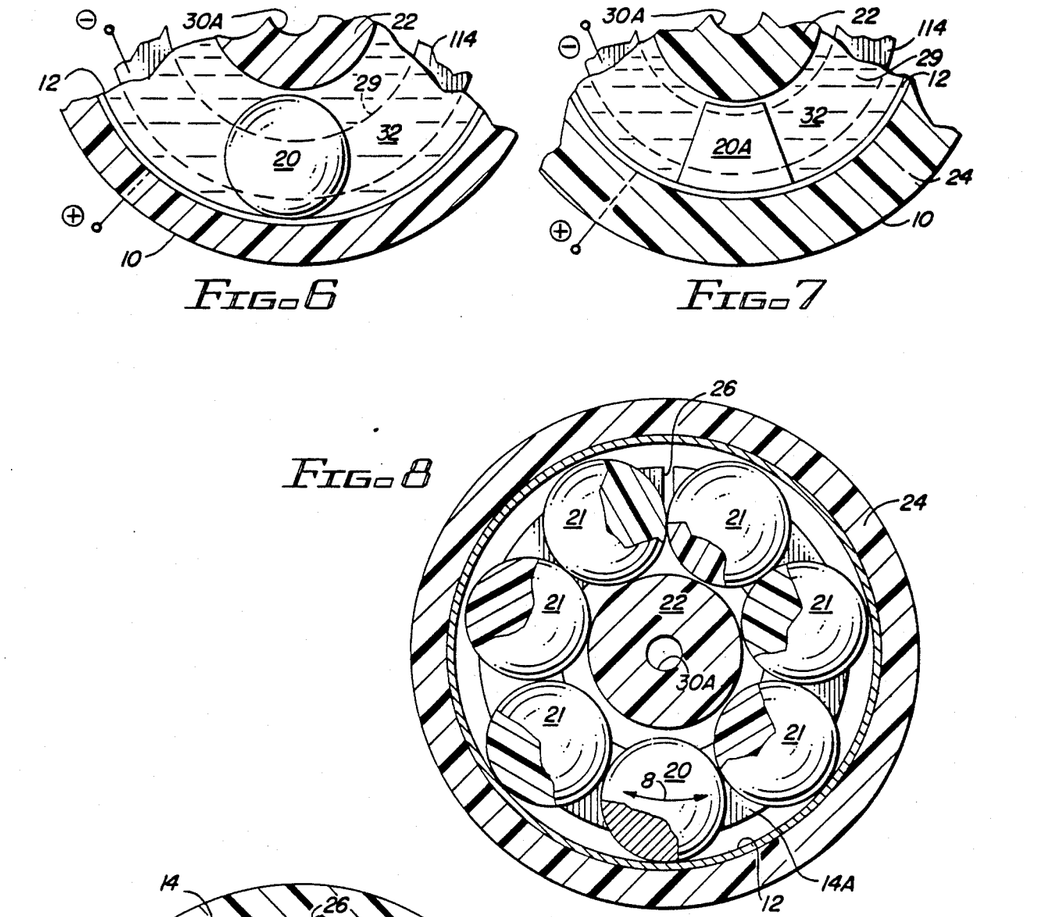
FIG. 6 is a partial section view of another embodiment of the invention in which a dielectric fluid is utilized to dampen the effect of vibrations on the conductive spherical ball.
FIG. 7 is a partial section view illustrating an embodiment of the invention in which a conductive liquid is utilized.
FIG. 8 is a section view of an embodiment of the invention in which light insulative movable balls contained in the annular chamber with the heavy conductive spherical ball act to dampen the effect of vibration.

A problem that can arise if clinometer 1 is mounted on a structure that is subject to a large level of vibration is that electrical contact between conductive spherical ball 20 and the annular resistors 14A and 14B and the cylindrical conductor 12 can be intermittent, causing signal processing errors and/or readout errors. In accordance with the present invention, a variety of techniques are disclosed for damping the "bouncing" of conductive ball 20 due to vibrations. In FIG. 6, the annular cavity is filled with electrically insulative dielectric fluid, as indicated by horizontal dashed lines 29. The dielectric fluid does not modify electrical contact between the annular resistive pattern 114 and cylindrical conductor 12, but acts to dampen movement of conductive ball 20 relative to cylindrical conductor 12 and annular resistor 114.

FIG. 7 illustrates a structure in which a quantity or bubble 20A of conductive liquid such as mercury replaces conductive ball 20, providing electrical contact between the resistive annular resistor 114 and conductor 12 indicative of the angle of inclination despite vibration of housing 24. Optionally, dielectric fluid 29 also can be provided in the structure of FIG. 7.

FIG. 8 illustrates another approach to ensuring reliable electrical contact between conductive ball 20, cylindrical conductor 12, and the annular resistors 14A and 14B by providing a sufficient number of lightweight electrically insulative, movable balls 21 in the annular cavity. The balls are sufficiently light that they are moved or displaced by forces exerted thereby by heavy spherical conductive ball 20 as it seeks the lowest level in the annular cavity. The weight of the insulative balls 21 and the frictional forces therebetween, and their size dampen bouncing of conductive ball 20 within the cavity due to vibration, improving electrical contact to cylindrical conductor 12 and side wall resistors 14A or 14B.

Figure 9:
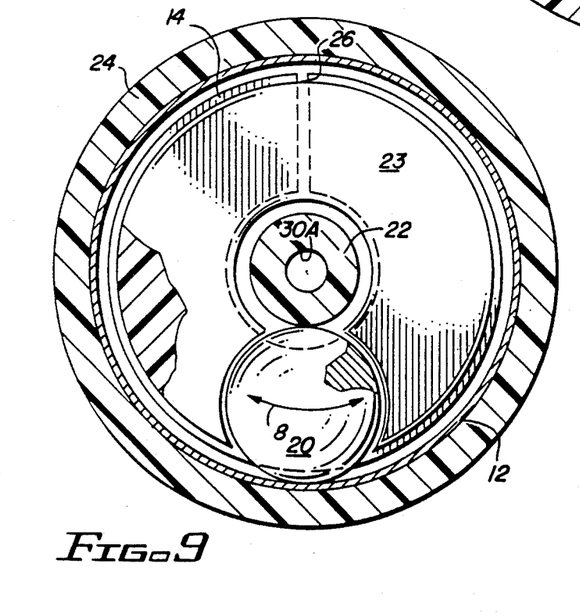
FIG. 9 is a section view of another embodiment of the invention in which a partial doughnut-shaped dielectric contained within the annular chamber dampens the effect of vibration.

FIG. 9 shows yet another structure for the same purpose. A doughnut-shaped, electrically insulative structure 23 fills the portion of the annular cavity of clinometer 1 not filled by conductive spherical ball 20, and acts to dampen bouncing of conductive ball 20 caused by vibration of the device, improving electrical contact.

Figure 10:
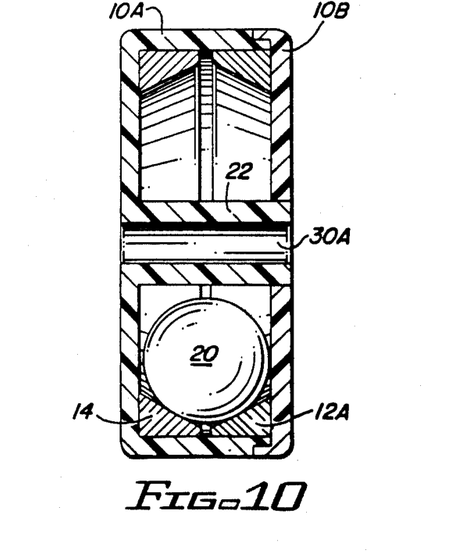
FIG. 10 is a section view diagram illustrating a structure including an alternate resistor and race conductor structure for supporting and electrically contacting the conductive ball.

FIG. 10 shows an alternate structure in which the annular vertical resistor 14A is replaced by a generally cylindrical resistor 14 that, in conjunction with a similar generally cylindrical conductor 12A, form a race in which conductive ball 20 rolls. Resistor 14 has a gap similar to gap 26 of the previous figures, located at its highest portion. As shown in FIG. 10, the cross-section of the race including resistor 14 and conductor 12A is slightly V-shaped, so that the ball 20 rests in the V-shaped groove, as shown in FIG. 10.

Figure 11:
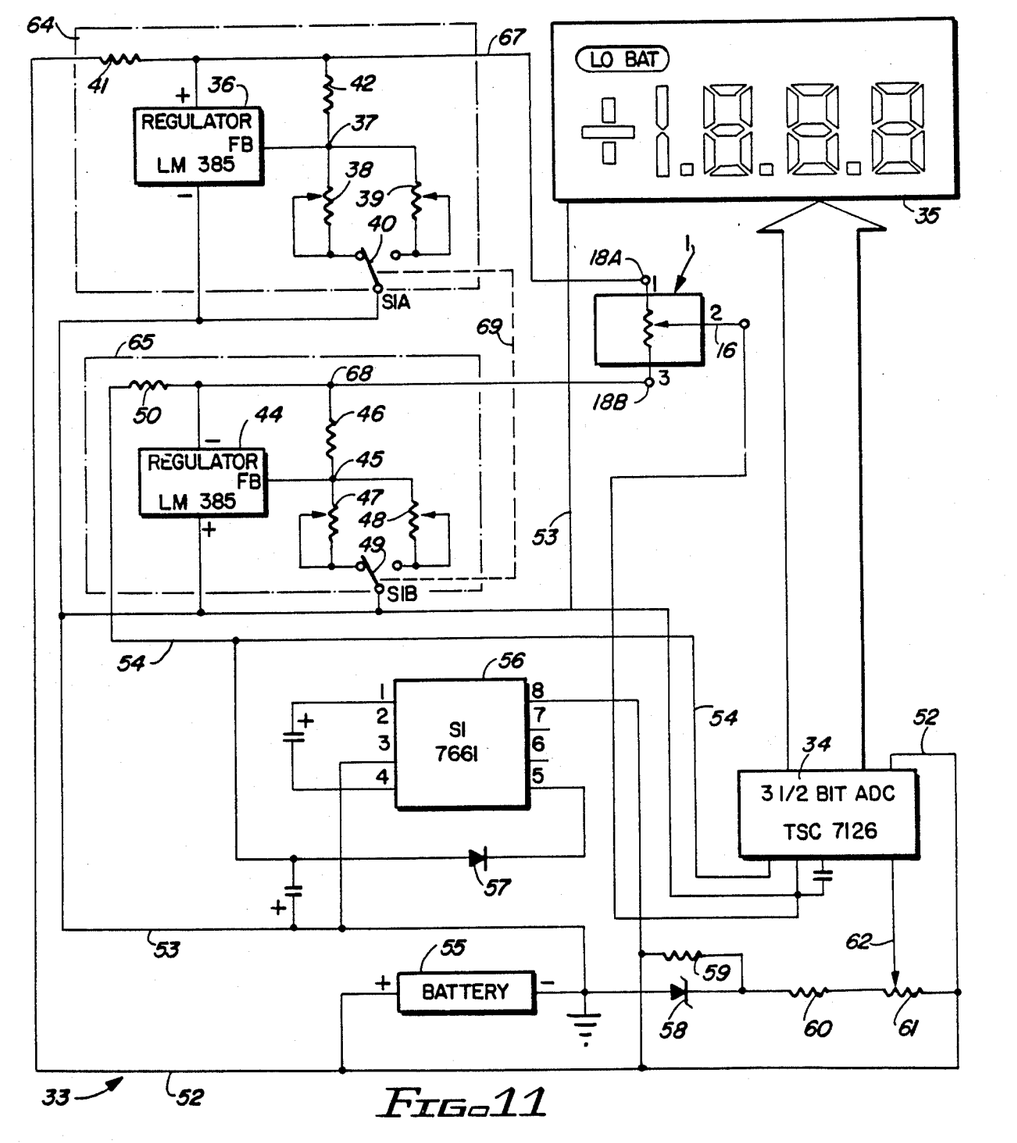
FIG. 11 is a schematic circuit diagram of a circuit for producing a digital readout indicative of the inclination of the clinometer of FIG. 1.

Referring next to FIG. 11, clinometer 1 is shown connected to circuitry which properly electrically biases terminals 18A and 18B (and similarly biases terminals 18C and 18D if they are used) with positive and negative reference voltages, respectively, and provides an analog voltage division signal on conductor 16 representative of the ratios between resistance between conductor 16 and conductor 18A and the total resistance between conductors 18A and 18B.

In FIG. 11, terminal 18A is connected to a positive reference voltage produced by a positive voltage reference circuit 64, and terminal 18B is connected to a negative reference voltage produced by negative voltage reference circuit 65. Conductor 16 is connected to the analog input of a TSC7126 three and one-half bit analog-to-digital converter 34 manufactured by Intersil and Teledyne.

Positive reference voltage circuit 64 is connected by conductor 52 to the positive terminal of a six volt battery 55. Reference numeral 56 designates an integrated circuit voltage converter that "inverts" the positive six volts on conductor 52 to produce a negative six volts on conductor 54. Voltage converter circuit 56 can be a Siliconix 7661 voltage converter. Its output is connected to the cathode of a diode 57, the anode of which is connected to conductor 54. Conductor 54 also is connected to the negative voltage supply input of analog-to-digital converter 34.

Positive six volt conductor 52 and ground conductor 53 are connected to positive reference voltage circuit 64. Similarly, negative six volt conductor 54 and ground conductor 53 are connected to negative reference voltage circuit 65.

In FIG. 11, zener diode 58 performs the function of producing a 1.2 volt reference voltage on its cathode, holding that point at precisely 1.2 volts above ground voltage conductor 53. The voltage produced on conductor 62 by the combined action of zener diode 58, 100 kilohm resistor 59, 100 kilohm resistor 60, and 10 kilohm potentiometer 61 provides a precise reference voltage to be applied to pin 36 of three and one-half bit analog-to-digital converter 34. Resistor 59 is connected between +6 volt conductor 52 and the cathode of zener diode 58. Resistor 60 is connected in series with potentiometer 61 between +6 volt conductor 52 and the 1.2 volt reference point produced by the cathode of zener diode 58.

Positive reference voltage circuit 64 includes a LM385 voltage circuit 36, by National Semiconductor. Its positive supply terminal is connected by conductor 67 to terminal 18A of clinometer 1 to one terminal of 20 kilohm resistor 41, the other terminal of which is connected to +6 volt conductor 52. The negative supply terminal of regulator 36 is connected to ground conductor 53. The control input of regular circuit 36 is connected by conductor 37 to one terminal of 110 kilohm resistor 42, 500 kilohm potentiometer 38, and 100 kilohm potentiometer 39. A single-pole, double-throw switch 40 having its control conductor 40 connected to ground conductor 53 connects the open terminal of potentiometer 38 or potentiometer 39 to the ground voltage. Resistor 42 also is connected to terminal 18A. Switch 40 of negative voltage reference circuit 65 is ganged with switch 49, as indicated by dotted line 69.

Negative reference voltage circuit 65 also includes a LM385 regulator 44. Its negative supply terminal is connected by conductor 68 to terminal 18B of sensor 1 and one terminal of 20 kilohm resistor 50. The other terminal of resistor 50 is connected to negative six volt conductor 54. The positive supply terminal of regulator 44 is connected to ground conductor 53.

The control input of regulator circuit 44 is connected by conductor 45 to one terminal of 110 kilohm resistor 46, the other terminal of which is connected to terminal 18B of sensor 1. Conductor 45 is also connected to the upper terminals of 100 kilohm potentiometer 47 and 500 kilohm potentiometer 48, the lower terminals of which are connected to the two switchable poles of single-pole double-throw switch 49. The control terminal of switch 49 is connected to ground conductor 53.

The function of ganged switch 40 and 49 is to select the type of calibration or type of readout desired from three and one-half digit LCD readout unit 35. If ganged switch 40, 49 is in the position shown, the readout is calibrated to indicate the number of degrees of inclination of clinometer 1 from 90 degrees to +90 degrees. If ganged switch 40, 49 is in its opposite position, connecting the lower ends of potentiometer 39 and 48 to ground conductor 53, the readout will be "percent of grade", a term used in road construction and railroad construction, wherein the maximum possible grade is defined to be 45 degrees, and the actual inclination is measured in percentage of the maximum 45 degree inclination. If ganged switch 40, 49 is in the position shown, the voltage +1.800 volts will be produced on conductor 67, and −1.800 volts will be produced on conductor 68. However, if ganged switch 40, 49 is in its opposite state, then +4.0 volts will be produced on conductor 67 and −4.0 volts will be produced on conductor 68.

The digital outputs of analog-to-digital converter circuit 34 are connected to the various segment control inputs of three and one-half bit LCD display circuit 35, which can be a Model SP-201, manufactured by Seiko.

Thus, the described embodiment of the invention provides an inexpensive apparatus which can be used as a clinometer, or, if different calibration circuitry is used, as an accelerometer. Essentially continuously variable outputs are provided corresponding to as much as about ±178 degrees of variation in the orientation of the clinometer, depending on the calibration of the device. Some embodiments of the invention permit reliable operation in an environment with a high level of vibration. An accurate digital readout is accomplished with low power circuitry.

Figure 12:
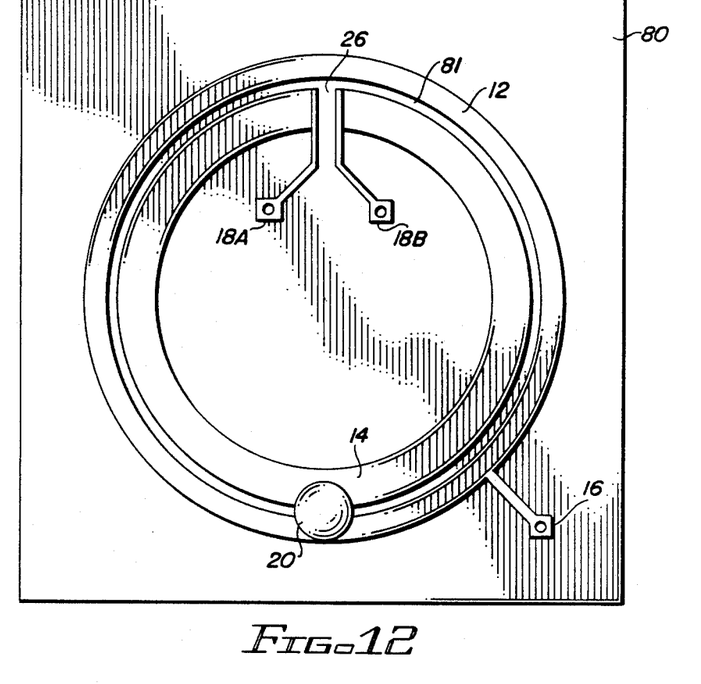
FIG. 12 is a section view diagram illustrating a structure with alternate placement of the resistor, race conductor and gap therebetween.

FIG. 12 shows another alternate structure in which a "liquid rolling conductor", typically mercury, replaces spherical conductor ball 20 of FIGS. 2 and 10 and contacts circular conductor 12 and circular resistor 14, both of which are in the form of layers disposed on a planar substrate 80. (Note that the friction between the liquid conductor and the confining walls results in effective damping of the effects of vibration.) As in FIGS. 2 and 3, terminal 16 is electrically connected to annular conductor 12. Terminals 18A and 18B are connected to the respective ends of annular ring 14 on opposite sides of gap 26. The substrate 80 can be composed of ceramic.

Conductor ring 12 is composed or silver deposited on substrate 80. Resistor 14 is composed of carbon-based polymer or precious metal silicate, both of which are commercially available, deposited on substrate 80. Typically, the width of ring conductor 12 is 3 mils. Annular gap 81 between conductor 12 and resistor 14 is typically 3 mils.

Figure 14:
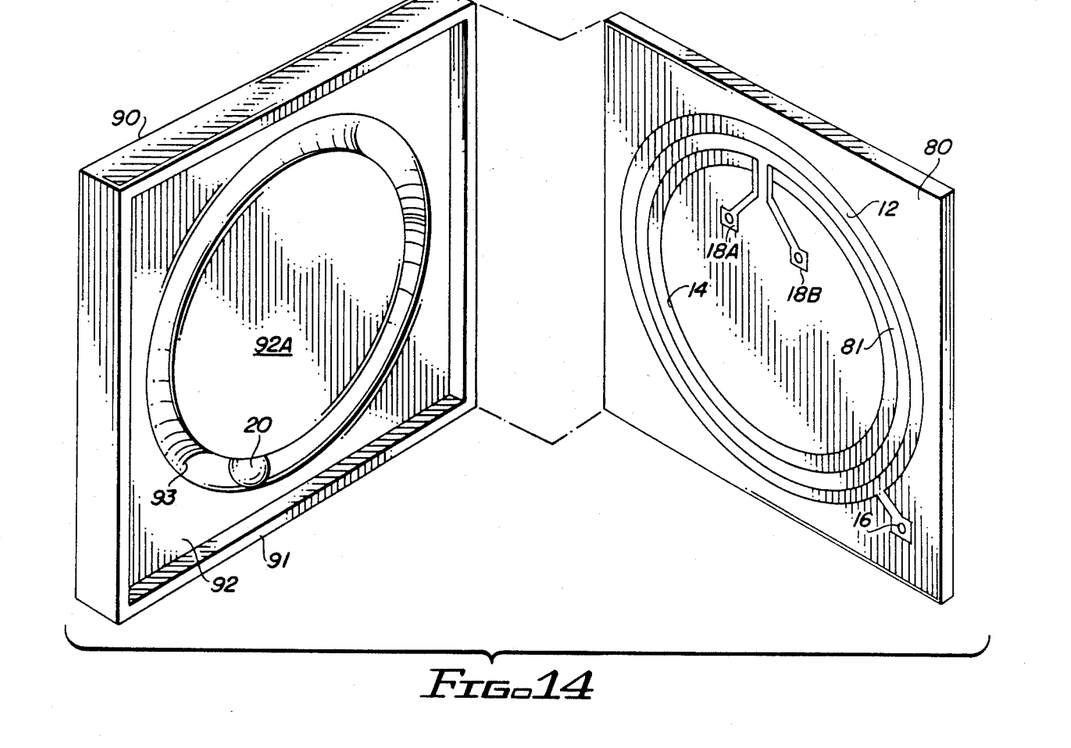
FIG. 14 is an exploded view of another embodiment similar to the embodiment of FIG. 12.

The substrate 80 with the conductor ring 12 and resistor 14 form one vertical wall of a cylindrical cavity similar to the cavity of the above-described embodiments of the invention, having an opposite wall parallel to substrate 80 which confines rolling mercury conductor 20. FIG. 14 shows the opposite wall 90, having a recessed planar surface 92 with an semicircular groove 93, which, in cooperation with substrate 80, confines liquid mercury ball 20. The left face of substrate 80 abuts against planar surface 92. Typically, the diameter of rolling mercury 20 is approximately 0.06 inches. A space between the wall formed by substrate 80 and the opposite parallel vertical wall confining rolling fluid conductor 20 is approximately 0.06 inches, so as to confine the mercury conductor 20 and cause it to ensure that the mercury conductor always contacts both conductor 12 and resistor 14. The relative position of resistor 14 and conductor 12 can be reversed, as shown in FIG. 12A.

Figure 12A:
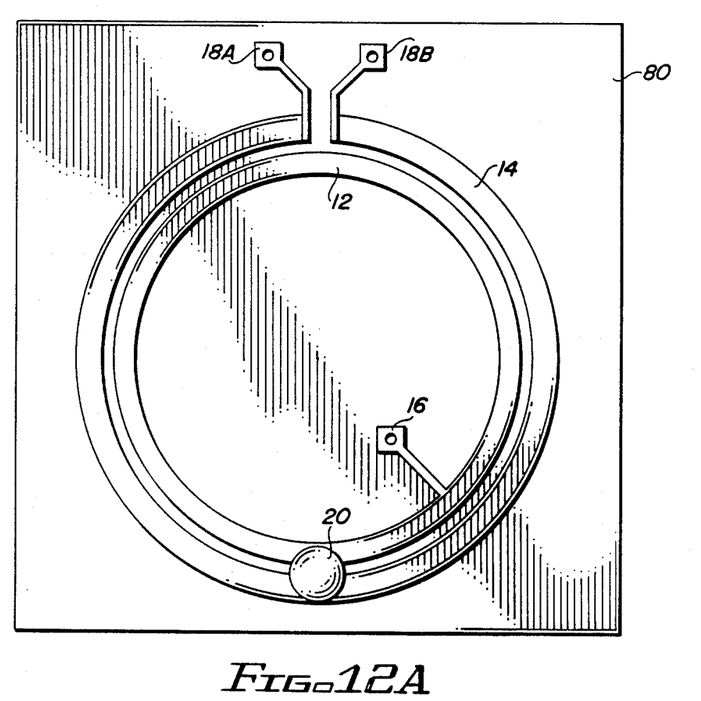
FIG. 12A is a diagram of another embodiment of the invention in which the relative location of the resistor and conductor are reversed from the arrangement shown in FIG. 12.

The substrate 80 of FIG. 12A can be covered with a cover structure 90, as shown that includes an annular semicircular groove 93 which confines mercury ball 20. Groove 93 is formed in planar surface 92, 92A of cover 90 and subtends gap 81 between resistor 14 and conductor 12, so mercury ball 20 always contacts both. A peripheral lip 91 of cover 90 allows substrate 80 to be easily aligned with cover 90 to assemble the inclinometer. The semicircular cross section of groove 93 minimizes friction with the liquid ball 20.

Figure 13:
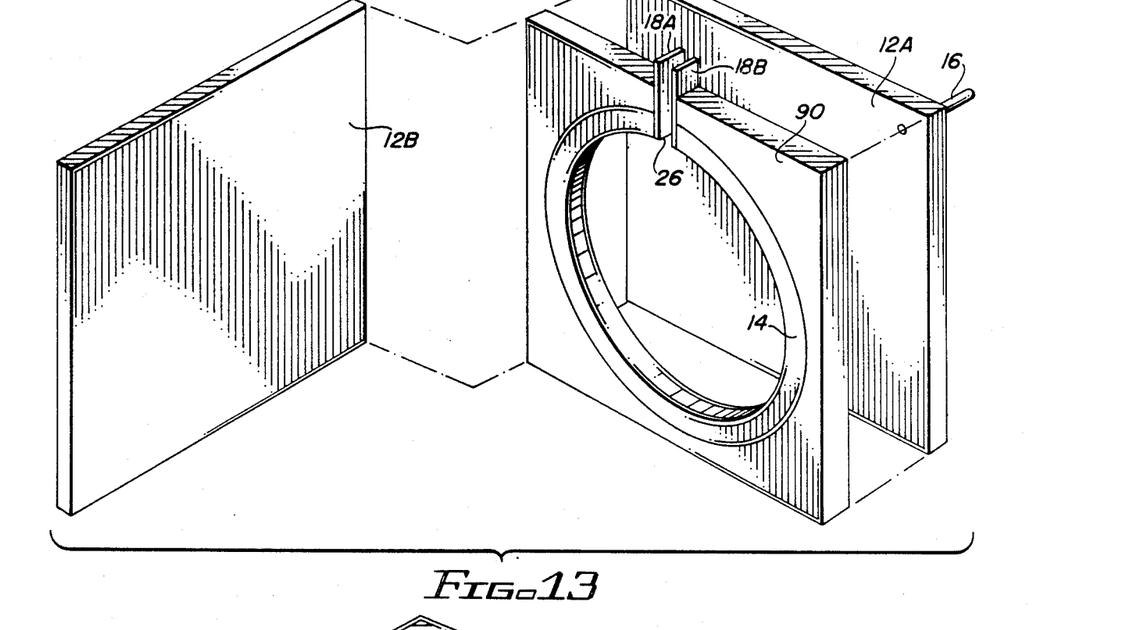
FIG. 13 is a perspective, exploded diagram of another embodiment of the invention.

Another embodiment is shown in the exploded view of FIG. 13, wherein a liquid ball of mercury (not shown) rests in the lowest portion of a cavity defined by cylindrical, annular resistor 14 and vertical conductive walls 12A and 12B. Walls 12A and 12B are electrically shorted together, and suitable gaskets (not shown) are positioned between the sides of cylindrical resistor 14 and the conductive walls 12A and 12B to prevent electrical contact therebetween. End terminals of cylindrical, annular resistor 14 are connected to the appropriate end thereof on either side of narrow gap 26 and are designated by numerals 18A and 18B, as in the earlier embodiments. Gap 26 usually is located at the topmost portion of cylindrical, annular resistor 14 when the clinometer is level. Terminal 16 is connected to conductive wall 12A. The circuit of FIG. 11 is connected to terminals 16, 18A and 18B as described before. Thus, the mercury ball electrically contacts both conductive wall 12A and a portion of cylindrical, annular resistor 14, depending on the angle of inclination of the clinometer.

While the invention has been described with respect to a number of embodiments, those skilled in the art will be able to make various modifications to the described embodiment without departing from the true spirit and scope of the invention. It is intended that all structures and techniques which are equivalent to those described herein in that they perform substantially the same function in substantially the same way to achieve the same result are within the scope of the invention. For example, resistor values in the described embodiment of the invention can be changed to cause the digital readout to accurately indicate inclinations of ±178 degrees. The readout can be analog, rather than digital. The polarity relative to the angle of inclination may be discerned.

We claim:
1. A clinometer comprising:
   (a) a housing surrounding an annular cavity, the housing including an inner wall bounding the cavity;
   (b) an annular resistor disposed on the wall, the annular resistor having a first end and a second end separated by a first narrow gap, and first and second terminals connected to the first and second ends, respectively;
   (c) a rolling conductor loosely disposed in the cavity;
   (d) an annular conductor disposed on the wall and a third terminal connected to the annular conductor, both the annular resistor and the annular conductor electrically contacting the rolling conductor, the rolling conductor rolling to the lowest kinetic energy location in the cavity;
   (e) means for applying a positive voltage to the first terminal and a negative voltage to the second terminal, the rolling conductor receiving a resistive division voltage representative of an angle of inclination of the clinometer and conducting the resistive division voltage to the third conductor for angles of inclination in the range from approximately −178 degrees to +178 degrees; and
   (f) means connected to the third terminal and responsive to the resistive division voltage for producing a reading of the magnitude of the angle of inclination.

2. The clinometer of claim 1 wherein the rolling conductor is liquid.

3. The clinometer of claim 2 wherein the liquid is mercury.

4. The clinometer of claim 2 wherein the annular resistor and the annular conductor are both layers formed on an insulative substrate forming a part of the inner wall.

5. The clinometer of claim 4 wherein a narrow annular gap separates the annular resistor and the annular conductor, the annular resistor, the annular conductor, and the annular gap being concentric.

6. The clinometer of claim 5 wherein the inner wall includes an annular groove that subtends the annular gap and confines the liquid rolling conductor.

7. The clinometer of claim 5 wherein the annular conductor is outside of the annular resistor.

8. The clinometer of claim 5 wherein the annular resistor is outside of the annular conductor.

9. The clinometer of claim 2 wherein the cavity is narrow enough to confine the liquid, surface tension of the liquid tending to cause it to form a liquid mass that electrically contacts and conforms to both the annular conductor and the annular resistor.

10. A clinometer comprising:
    (a) a housing surrounding an annular cavity, the housing including an inner cylindrical wall bounding the cavity;
    (b) a conductive wall bounding the cavity, and a first terminal connected to the conductive wall;
    (c) an annular resistor disposed on the cylindrical wall, the annular resistor having a first end and a second end separated by a first narrow gap, and second and third terminals connected to the first and second ends, respectively;
    (d) a rolling liquid conductor loosely disposed in the cavity and electrically contacting both the annular resistor and the annular conductor, the rolling liquid conductor rolling to the lowest kinetic energy location in the cavity;
    (e) means for applying a positive voltage to the second terminal and a negative voltage to the third terminal, the rolling liquid conductor receiving a resistive division voltage representative of an angle of inclination of the clinometer and conducting the resistive division voltage to the conductive wall for angles of inclination in the range from approximately −178 degrees to +178 degrees; and
    (f) means connected to the first terminal and responsive to the resistive division voltage for producing a readout of the magnitude of the angle of inclination.

11. A clinometer comprising:
    (a) a housing surrounding an annular cavity, the housing including an inner wall bounding the cavity;
    (b) an annular resistor disposed on the wall, the annular resistor having a first end and a second end separated by a first gap, and first and second terminals connected to the first and second ends, respectively;
    (c) a rolling conductor loosely disposed in the cavity;
    (d) an annular conductor disposed on the wall and a third terminal connected to the annular conductor, both the annular resistor and the annular conductor electrically contacting the rolling conductor, the rolling conductor rolling to the lowest kinetic energy location in the cavity;
    (e) means for applying a positive voltage to the first terminal and a negative voltage to the second terminal, the rolling conductor receiving a resistive division voltage representative of an angle of inclination of the clinometer and conducting the resistive division voltage to the third conductor; and
    (f) means connected to the third terminal and responsive to the resistive division voltage for producing a reading of the magnitude of the angle of inclination.

* * * * *